(12) United States Patent
Witt (10) Patent No.: US 8,588,288 B2
(45) Date of Patent: Nov. 19, 2013

(54) METHOD AND APPARATUS FOR CONTROLLING A CONTINUOUS TIME LINEAR EQUALIZER

(75) Inventor: Kevin James Witt, Colorado Springs, CO (US)

(73) Assignee: Maxim Integrated Products, Inc., San Jose, CA (US)

(*) Notice: Subject to any disclaimer, the term of this patent is extended or adjusted under 35 U.S.C. 154(b) by 399 days.

(21) Appl. No.: 12/950,790

(22) Filed: Nov. 19, 2010

(65) Prior Publication Data

US 2012/0128053 A1    May 24, 2012

(51) Int. Cl.
*H03H 7/30* (2006.01)
(52) U.S. Cl.
USPC ........ 375/232; 375/229; 375/230; 375/259; 375/316; 375/343
(58) Field of Classification Search
USPC ........ 375/211, 229, 230, 232, 233, 259, 295, 375/316, 343, 377
See application file for complete search history.

(56) References Cited

U.S. PATENT DOCUMENTS

| | | | |
|---|---|---|---|
| 7,577,193 B2 * | 8/2009 | Goth | 375/232 |
| 8,000,384 B2 * | 8/2011 | Beukema et al. | 375/232 |
| 8,335,249 B1 * | 12/2012 | Su et al. | 375/232 |
| 8,390,314 B2 * | 3/2013 | Dang et al. | 326/21 |
| 8,428,113 B1 * | 4/2013 | Katic et al. | 375/232 |
| 2008/0304557 A1 * | 12/2008 | Hollis | 375/231 |
| 2009/0310666 A1 * | 12/2009 | Yamaguchi et al. | 375/232 |
| 2010/0008414 A1 * | 1/2010 | Lee et al. | 375/233 |
| 2011/0317753 A1 * | 12/2011 | Marquina et al. | 375/232 |
| 2012/0076181 A1 * | 3/2012 | Aziz et al. | 375/219 |
| 2012/0106539 A1 * | 5/2012 | Ferraiolo et al. | 370/351 |
| 2012/0201289 A1 * | 8/2012 | Abdalla et al. | 375/233 |
| 2012/0207196 A1 * | 8/2012 | Zerbe et al. | 375/219 |

* cited by examiner

*Primary Examiner* — Hirdepal Singh
(74) *Attorney, Agent, or Firm* — TIPS Group (57) ABSTRACT

An example method for controlling a continuous time linear equalizer includes: developing a voltage histogram of a signal present at an output of a continuous time linear equalizer; developing a quality factor for the voltage histogram; comparing the quality factor with a prior quality factor; decreasing an equalization of the continuous time linear equalizer if the quality factor is less than the prior quality factor and increasing the equalization of the continuous time linear equalizer if the quality factor is greater than the prior quality factor.

20 Claims, 5 Drawing Sheets

METHOD AND APPARATUS FOR CONTROLLING A CONTINUOUS TIME LINEAR EQUALIZER

BACKGROUND

There are many electronic applications for which data needs to be transmitted at high speeds over band-limited channels. For example, data storage systems, servers, data communication systems and digital video systems all need to provide high-speed serial links over band-limited channels. This can be accomplished by providing a transmitter at one end and a receiver at the other end of a "telecommunications channel" or "communication link."

In telecommunications, inter-symbol interference (ISI) is a form of signal distortion wherein a transmitted symbol interferes with subsequent transmitted symbols. This is an unwanted phenomenon as the previous symbols have similar effect as noise, thus making the communication channel less reliable. That is, the presence of ISI may introduce errors at the receiver output. Therefore, in the design of telecommunication systems, an objective is to minimize the effects of ISI and thereby deliver the digital data to its destination with the lowest error rate possible, e.g. with the best signal-to-noise ratio (SNR). Ways to light inter-symbol interference include, for example, adaptive equalization techniques.

For example, Continuous Time Linear Equalizers (CTLE) can be used in communication links to compensate for the channel's frequency dependent loss which causes ISI. The CTLE's equalization parameters are adjusted to minimize the ISI and jitter of the CTLE's output. This adjustment is typically set manually for each channel and susceptible to environmental, part-to-part and channel manufacturing, variability.

Methods exist to automatically adjust the CTLE equalization parameters for implementations which include a clock and data recovery circuitry. For example, the circuits described in "Electrical signal processing techniques in long-haul fiber optic systems," Winters, J. H. & Gitlin, R. D., AT&T Bell Lab., IEEE Transactions on Communications, September 1990. These circuits recover a clock that is phase-locked to the input signal. Utilizing the recovered clock, the quality of the output "eye" can be measured at its center to optimize the CTLE, equalization parameters.

Analog methods exist that balance the high and low frequency content of the output waveform. These analog methods do not directly measure the output eye quality. For example, the MAX3805 Adaptive Receive Equalizer marketed by Maxim Integrated Products of Sunnyvale, Calif. is a continuous time linear equalizer ("CTLE") which utilizes a frequency domain analog technique to reduce the effects of ISI. By way of further example, the article "1-mW 12-Gb/s Continuous-Time Adaptive Passive Equalizer in 90-nm CMOS", by Doug Hun Shin, Ji Fun king, Frank O'Mahony and C. Patrick Yue, CICC, 2009, describes a continuous time linear equalizer ("CTLE") which also reduces the effects of ISI.

Both of the references cited above measure energy in two frequency bands and control the equalization of a CTLE to match the expected energy distribution for a random non-return-to-zero ("NRZ") data pattern at an expected data rate. ISI is reduced with a subsequent increase in SNR by properly controlling the equalization of the CTLEs.

While the apparatus described in these references operate well for their intended applications they also exhibit certain drawbacks under some circumstances. For example, these prior apparatus are susceptible to the analog filter's accuracy, offsets and production variations. Furthermore, these prior apparatus require an a priori knowledge of the serial data rate and expected distribution of energy of the transmitted symbols. Also, prior apparatus which utilize a phase-lock-loop (PPL) to recover the clock from the transmission consume a substantial additional amount of power.

These and other limitations of the prior art will become apparent to those of skill in the art upon a reading of the following descriptions and a study of the several figures of the drawing.

SUMMARY

By way or a non-limiting example, a method for controlling a continuous time linear equalizer includes: (a) developing a voltage histogram of a signal present at an output of a continuous time linear equalizer; (b) developing a quality factor for the voltage histogram; (c) comparing the quality factor with a prior quality factor; (d) decreasing an equalization of the continuous time linear equalizer lithe quality factor is less than the prior quality factor and increasing the equalization of the continuous time linear equalizer if the quality factor is greater than the prior quality factor; and (e) repeating acts (a) to (d).

By way of another non-limiting example, an apparatus for controlling a continuous time linear equalizer includes: a signal input; an equalization control output; a voltage histogram signal generator responsive to a signal at the signal input and operative to develop a voltage histogram signal; a quality factor signal generator responsive to the voltage histogram signal and operative to develop a quality factor signal; and an equalization control signal generator responsive to the quality factor signal and operative to develop an equalization control signal at the equalization control output.

By way of another non-limiting example, a continuous time linear equalizer circuit includes: a continuous time linear equalizer having a signal input, a signal output and an equalization control input; and a controller having a signal input coupled to the signal output of the continuous time linear equalizer and an equalization control output coupled to the equalization control input of the continuous time linear equalizer. The controller, in a further non-Muffing example, includes: a voltage histogram generator responsive to the signal input and operative to develop a voltage histogram signal; a quality factor generator responsive to the voltage histogram and operative to develop a quality factor signal; and an equalization control signal generator responsive to the quality factor signal and operative to develop an equalization control signal at the equalization control output.

By way of another non-limiting example, an apparatus for controlling a continuous time linear equalizer includes means for developing a voltage histogram of an input signal, means for developing a quality factor for the voltage histogram and means for developing an equalization control signal for a continuous time linear equalizer based, at least in part, upon the quality factor.

These and other embodiments and advantages and other features disclosed herein will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTIONS

Figure 1:
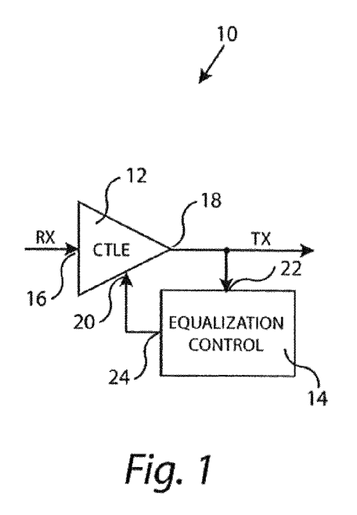
FIG. 1 is a block diagram of an example system with automatic control of a continuous time linear equalizer (CTLE)

FIG. 1 is a block diagram of a continuous time linear equalizer circuit 10 including a continuous time linear equalizer (CTLE) 12 and a controller 14, In this block diagram, the CTLE has a signal input 16, a signal output 18 and an equalization control input 20. In this example, a signal RX is applied to signal input 16 and a signal TX is developed at signal output 18. Controller 14 has a signal input 22 coupled to the signal output 18 of the CTLE and an equalization control output 24 coupled to the equalization control input 20 of the CTLE.

The controller 14 can be implemented as an analog circuit, a digital circuit or a combination of an analog and digital circuit. Furthermore, the controller 14 may include a digital processor designed to execute code segments stored in non-volatile memory such as ROM, PROM, EEPROM, etc. As used herein, a "signal" can be either analog or digital in nature, Regardless of the hardware or hardware/firmware implementation of controller 14, in an embodiment, set forth by way of example and not limitation, the controller 14 implements as process as set forth in FIG. 2.

Figure 2:
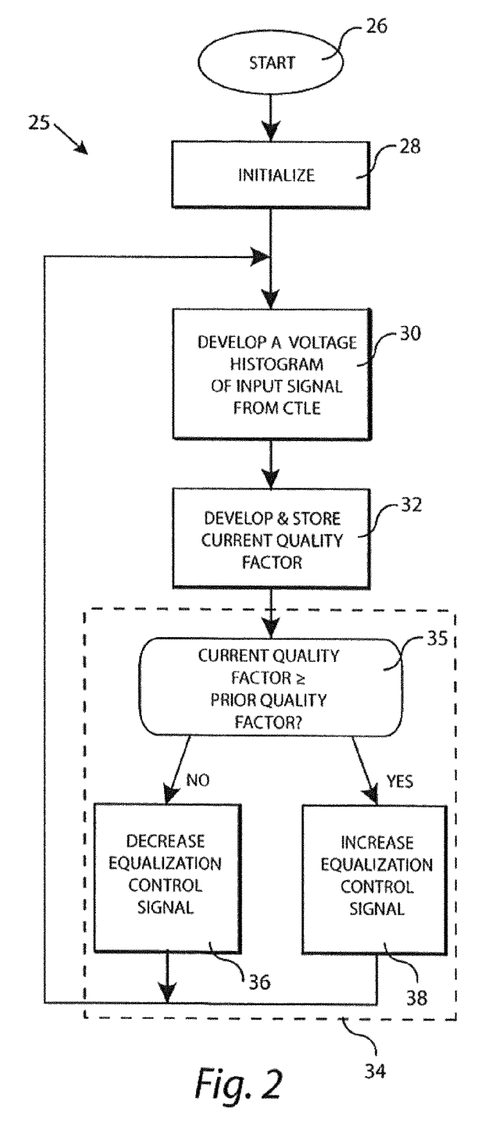
FIG. 2 is a process flow diagram of an example method for automatic control of a CTLE.

In FIG. 2, at process 25 for controlling CTLE 12 begins with operations 26 and 28 to initialize the controller 14. This will often occur on first power-up of the system and includes resetting registers, initializing variables, etc., particularly for the digital implementations of the controller 14, as will be appreciated by those of skill in the art. Next, in an operation 30, a voltage histogram is developed of the signal TX which is present at the signal input 22. As will be discussed in more detail subsequently, the voltage histogram is, in this example, developed by a windowing technique. Then, in at operation 32, a "quality factor" or "performance metric" is developed from the voltage histogram which is stored for current and later use. A block 34 is used to determine if the current quality factor is better than a previous quality factor and, if so, to adjust the equalization is the same direction that it had just been adjusted, if the current quality factor is worse, the direction of adjustment is reversed.

In this non-limiting example, the current quality factor is compared to a prior quality factor (e.g. a quality factor which had been previously stored) in an operation 35. If the current quality factor is less than the prior quality factor an operation 36 decreases an equalization control signal and if the current quality factor is greater than or equal to (in this example) the prior quality factor an operation 38 increases the equalization control signal. The process 25 then loops back to operation 30 to repeat the process.

Figure 3:
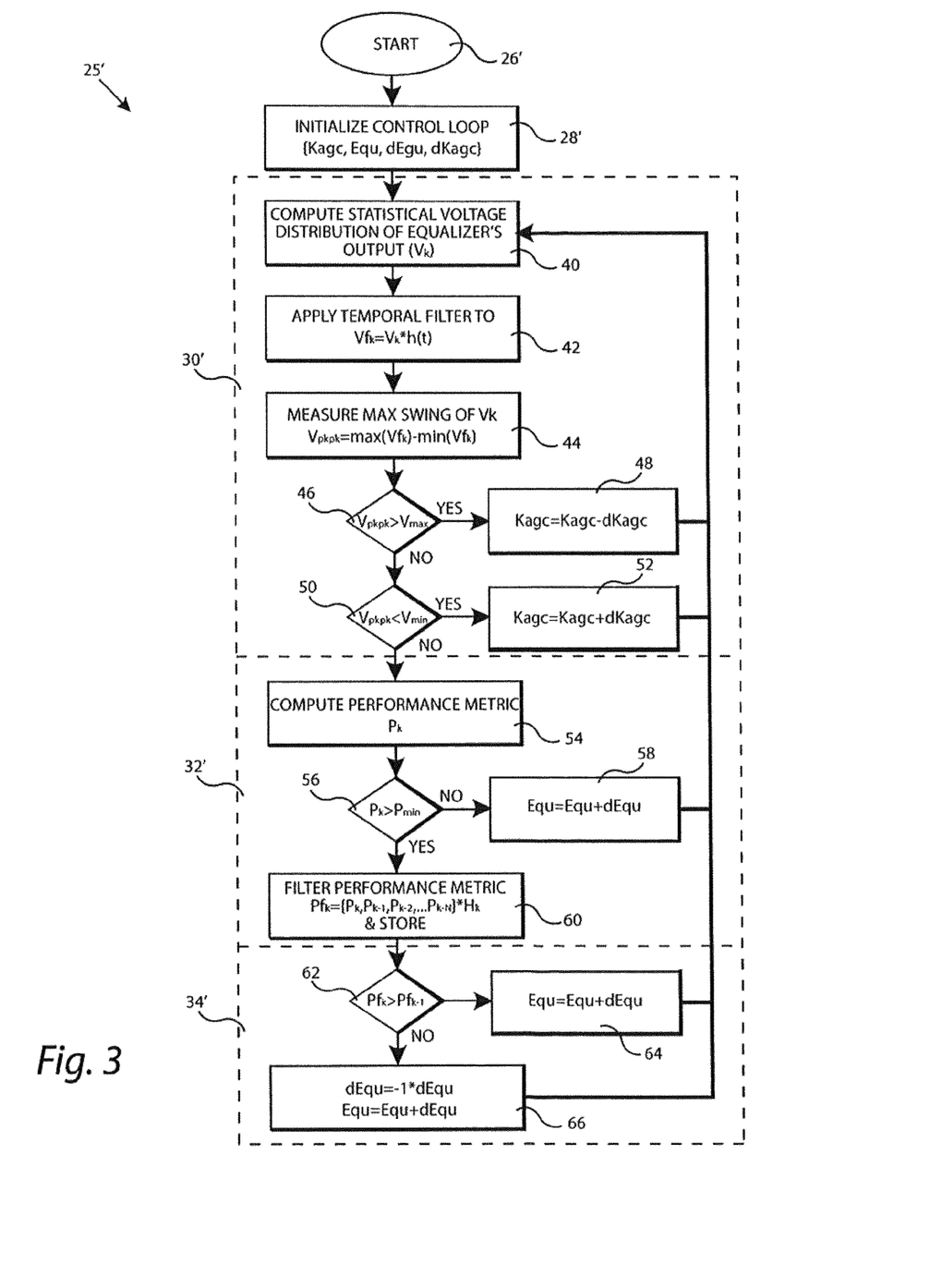
FIG. 3 is a process flow diagram of an example digital processor controlled method for automatic control of a CTLE.

FIG. 3 is a flow diagram of a computer-implemented process for controlling a continuous time linear equalizer. By "computer-implemented process" it is generally meant that code segments, e.g. program instructions stored in a non-transient and preferably non-volatile computer readable medium or "firmware" such as ROM, PROM, EPROM, EEPROM, flash memory, etc., are executed on a clocked digital processor ("digital processor"), such as a microcontroller, microprocessor, etc., to perform the process. A "digital processor" can also include hardware implementations, such as clocked state machines, which do not execute code segments in the traditional sense. In the non-limiting example of FIG. 3, the process is implemented by an integrated circuit including a clocked digital processor and firmware including code segments.

In FIG. 3, a process 25' for controlling a continuous time linear equalizer begins at 26' and, in an operation 28' a control loop is initialized (e.g. variables Kagc, Equ, dEqu, dKage). In this non-limiting example, Kage is an automatic gain control value, Equ is an equalization value, dEqu is an equalization control step, and dKage is a gain control step.

Next, a block 30' develops a voltage histogram. In an operation 40, a statistical voltage distribution of the CTLE output Vk is computed. Then, in this non-limiting example, a temporal filter is applied in an operation 42, e.g. Vfk=Vk*h(t). Then, in an operation 44, the Max Swing of Vk (e.g. the peak-to-peak voltage swing) is computed as Vpkpk=max(Vfk)−min(Vfk). Then, in a decision operation 46 it is determined whether Vpkpk is greater than Vmax and, if so, the variable Kage is decremented by dKage in an operation 48, e.g. the gain of the CTLE is decreased and the statistical voltage distribution is recalculate in operation 40. If Vpkpk is less than Vmax, it is then determined whether Vpkpk is less than Vmin in an operation 50. If so, Kage is incremented by dKage, e.g. the gain of the CTLE is increased and the statistical voltage distribution is recalculated in operation 40. If Vmin<Vpkpk<Vmax, the histogram is within a proper range of values and the process of block 30' is complete.

Block 32' develops a performance metric Pk. In this non-limiting example, an operation 54 computes the current performance metric Pk (aka "quality factor"). An operation 56 determines if the computed Pk is greater than a minimum value Pmin and, if not, Equ is incremented by dEqu in an operation 58 and process control returns to operation 40. This is to automatically increase the equalization if the quality factor is below a predetermined minimum. If Pk exceeds Pmin, then Pk is filtered in an operation 60. In this example, Pk (the current quality factor) is filtered with N prior, stored Pk values as Pfk={Pk, Pk−1, Pk−2, . . . , Pk−N}*Hk. The current filtered quality factor, Pfk, is stored for future use.

Block 34' increases or decreases the equalization signal based upon whether Pfk is greater than Pfk−1 as determined by an operation 62. If it is, the change dEqu in the equalization signal is moving in the proper direction and Equ is incremented by dEqu in an operation 64. If dEqu is moving the equalization signal in the wrong direction (e.g. the quality factor is decreasing) the sign of dEqu is reversed and Equ is incremented by the new dEqu in an operation 66. Process control then returns to operation 40.

Figure 4:
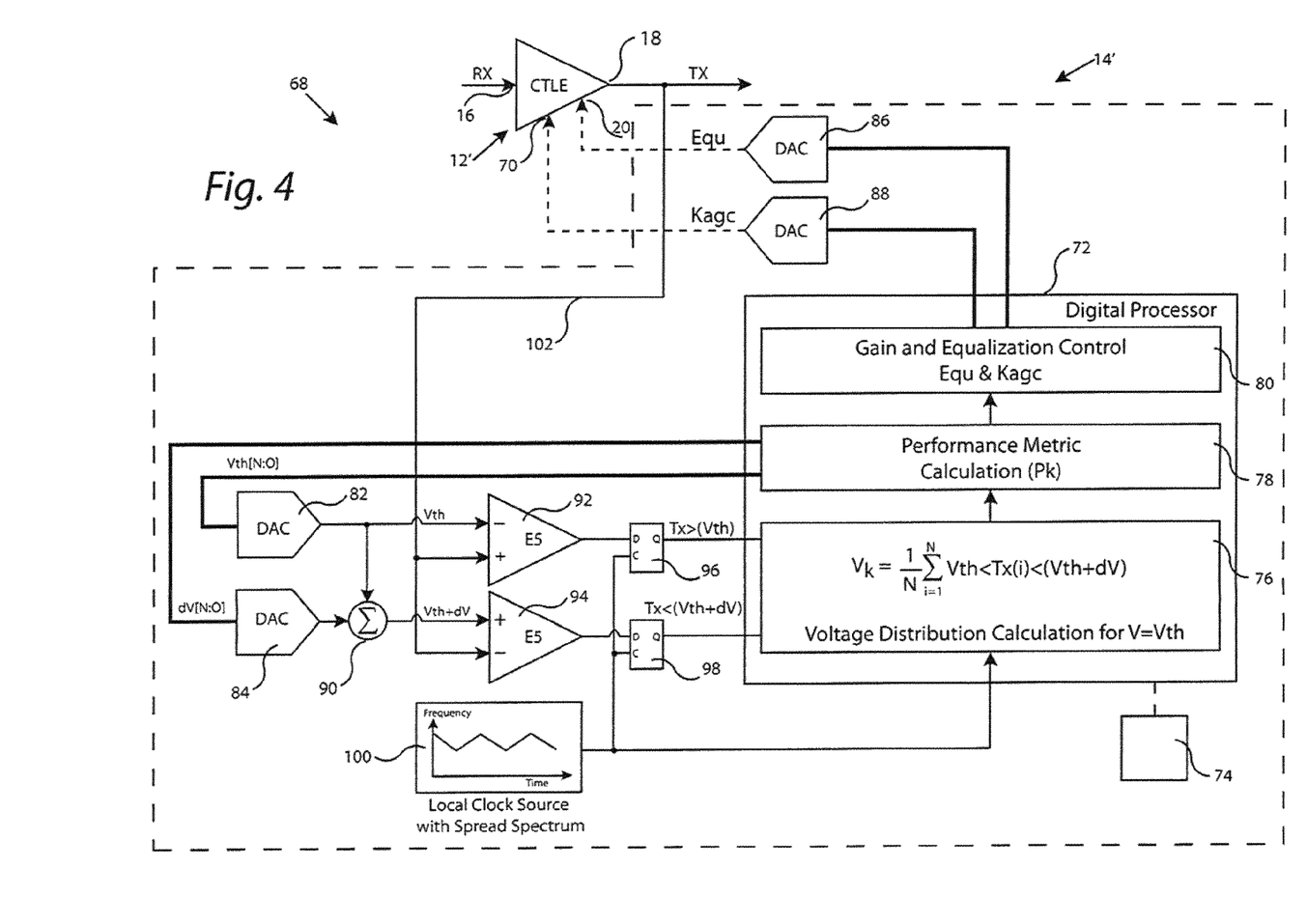
FIG. 4 is a block diagram of an example digital processor controlled apparatus for automatic control of a CTLE.

FIG. 4 is a block diagram of a CTLE circuit 68, set forth by way of non-limiting example, including a CTLE 12' and a controller 14'. In this example, the CTLE has both an equalization control input 20 and a gain control input 70. Controller 14 includes a digital processor 72 which, in this example, executes firmware 14 having code segments to implement a voltage histogram generator 76, a quality factor generator 78, and an equalization control signal generator 80. Of course, the voltage histogram generator, quality factor generator and equalization control signal generator can be implemented in other fashions, such as using analog, digital and mixed electronic circuitry, the example of FIG. 4 being just one non limiting example. In this example, controller 14' also includes digital-to-analog converters (DACs), a summer 90, comparators 92 and 94, flip-flops 96 and 98, and a spread-spectrum local clock source 100.

In operation, a signal input 102 of controller 14' is coupled to signal output 18 of the DIE. The signal input 102 is coupled to the positive and negative inputs, respectively, or comparators 92 and 94. DAC 82 applies a threshold voltage Vth to the negative input of comparator 92 and to summer 90. DAC 84 applies the threshold resolution voltage dV to the summer 90. The output of summer 90, which is Vth dV is applied to the positive input of comparator 94. The output of comparator 92 is applied to the D input of flip-flop 96 and the output of comparator 94 is applied to the D input of flip-flop 98. Both flip-flops 96 and 98 are clocked by the local clock source 100. The Q output of flip-flop 96 indicates if TX>Vth and the Q output of flip-flop 98 indicated is TX<+dV. The Q outputs of the flip-flops 96 and 98 are coupled to the digital processor 72, as is the local clock source 100.

The digital processor 72, in this non-limiting example, executes code segments stored in firmware 74 to calculate a voltage distribution in generator 76, a performance metric ("quality factor") in a generator 78 and control signals in a control signal generator 80 to, for example, implement the process 25' of FIG. 3. DACs 86 and 88 convert the digital output signals of digital processor 72 into Equ and Kagc control signals, respectively. The generator 78 controls DACs 82 and 84 with digital signals Vth[N:0] and dV[N:0], respectively.

The local clock source 100, in this non-limiting example, is designed to not become phase-locked with the signal on signal input 102. In this example, this is accomplished by providing a spread-spectrum clock signal, e.g. the illustrated saw-tooth, to prevent phase lock with the input signal.

Table 1, below, provides a summary of the digital performance metric of the digital processor 72 as describe above.

TABLE 1

Digital Performance Metric

Voltage Histogram $$V_k = \frac{1}{N}\sum_{i=1}^{N}((Vth_k) < Tx_i < (Vth_k + dV_k))$$

Filtered Voltage Histogram
$Vf_k = V_k * h_k$
Performance Metric $$P_i = \frac{\sum_k W_{sk} \cdot Vf_k}{\sum_k W_{tk} \cdot Vf_k}$$

or $$P_i = \sum_k W_{sk} \cdot Vf_k$$

$W_{sk}$ = Desired Signal Window
$W_{tk}$ = Signal Transistion Window

One way to study ISI in a data transmission system experimentally is to apply the received wave to the vertical deflection plates of an oscilloscope and to apply a sawtooth wave at the transmitted symbol rate R, 1/T to the horizontal deflection plates. The resulting display is called an eye pattern because of its resemblance to the human eye for binary waves. The interior region of the eye pattern is called the eye opening. An eye pattern provides a great deal of information about the performance of the pertinent system, e.g.:

1. The width of the eye opening defines the time interval over which the received wave can be sampled without error from ISI. It is apparent that the preferred time for sampling is the instant of time at which the eye is open widest.
2. The sensitivity of the system to timing error is determined by the rate of closure of the eye as the sampling time is varied.
3. The height of the eye opening, at a specified sampling time, defines the margin over noise.

Figure 5A:
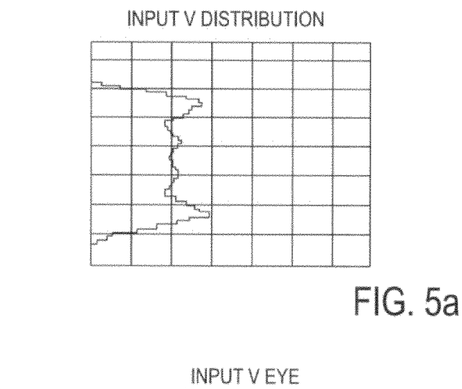
FIGS. 5a and 5b are graphs illustrating an example input voltage distribution and example output voltage distribution of a CTLE of the apparatus of FIG. 4.
Figure 5B:
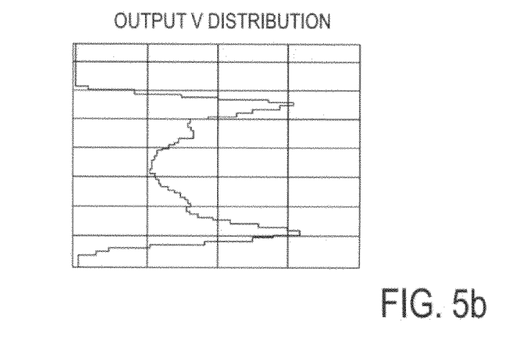
Figure 6A:
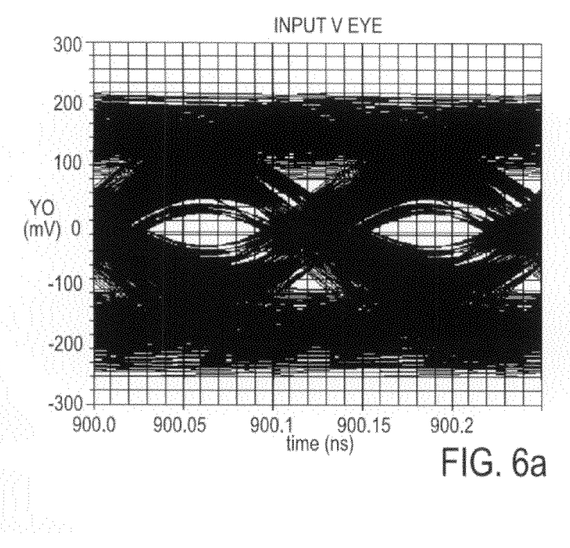
FIGS. 6a and 6b are graphs illustrating an example input eye signal and an example output eye signal of a CTLE of the apparatus of FIG. 4.
Figure 6B:
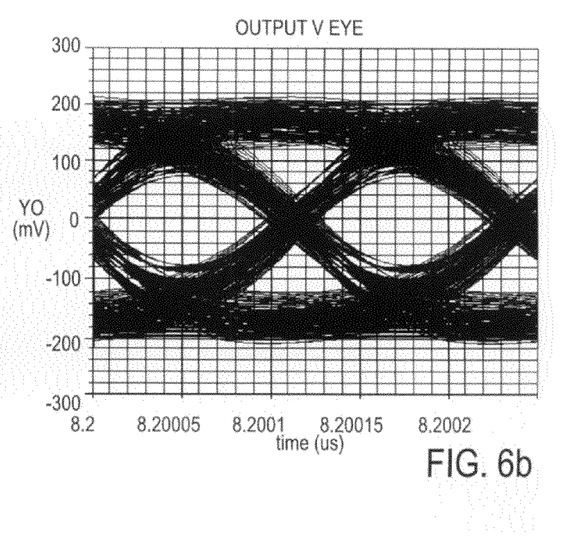

FIG. 5a illustrates an example input voltage ("V") distribution (aka "histogram") RX of FIG. 4 and FIG. 5b illustrates an example output voltage ("V") distribution TX of FIG. 4 when using the controller 14'. FIG. 6a is a graph of the "eye" produced by the RX signal FIG. 6b is a graph of the eye produced by the equalized TX signal. As noted, the eye of the equalized TX signal is a significant improvement over the non-equalized RX signal.

Figure 7:
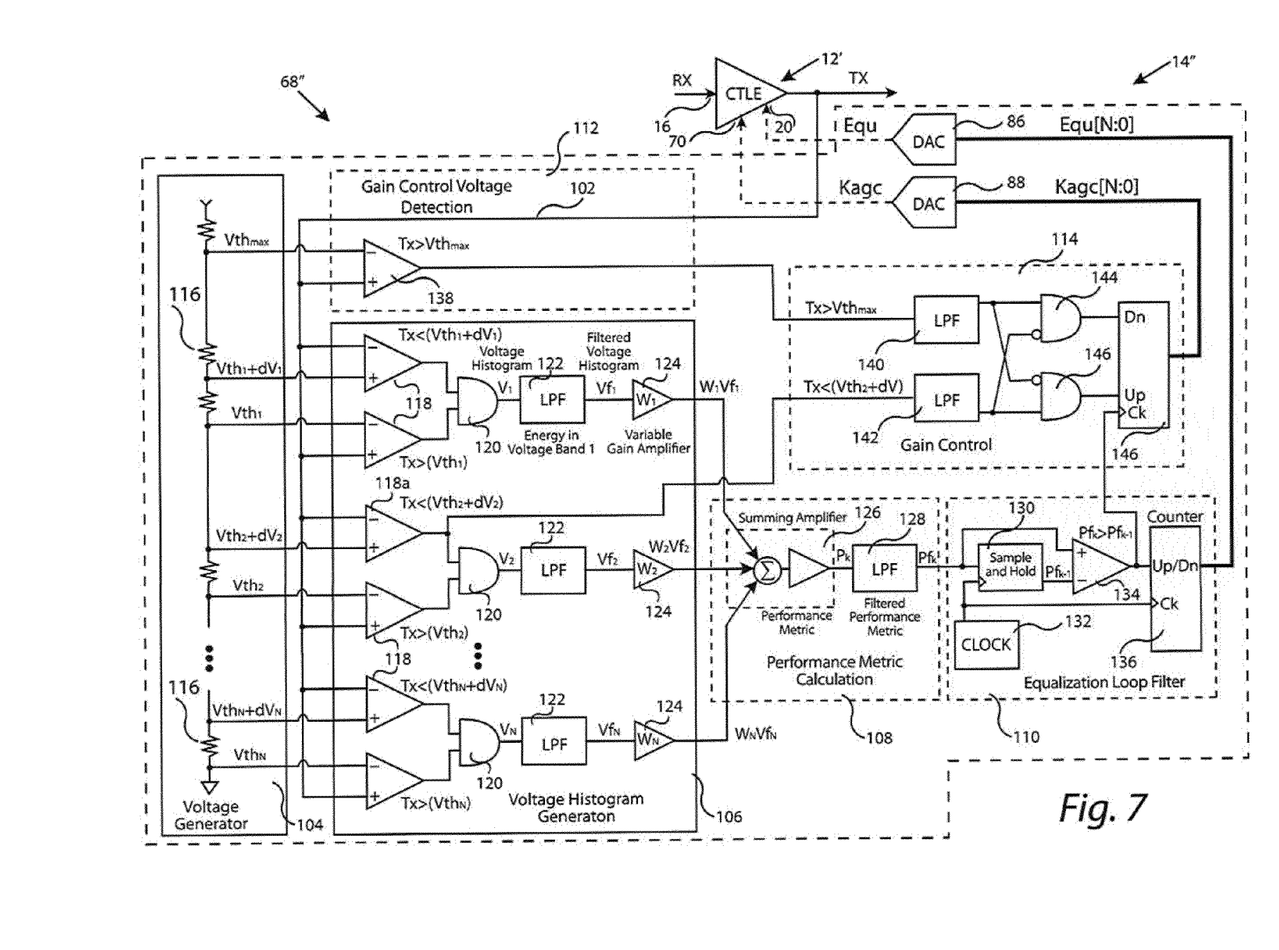
FIG. 7 is a block diagram of an example analog controlled apparatus for automatic control of a CTLE.

FIG. 7 illustrates a continuous time linear equalizer circuit 68" including a CTLE 12' and a controller 14" which can, for example, implement the process 25 of FIG. 2. It should be noted that the controller 14" does not include a digital processor and is primarily implemented with electronic components such as analog low pass filters, comparators, summers and amplifiers along with digital components such as AND gates, latches, counters, etc. The controller 14" is therefore a combination of analog and digital electronic components. Controller 14", in this non-limiting example, includes a voltage generator 104, a voltage histogram generator 106, a quality factor generator 108, an equalization control signal generator 110, a gain control voltage detector 112, and a gain control generator 114.

In this example, the voltage generator is represented by a series of resistors 116 which create a number of voltage "windows" to sample the voltage spectrum. It should be noted that this analog version can sample all of the windows in parallel, as opposed to the digital processor-based version discussed previously which sampled one window at a time. The voltage windows are applied to pairs of comparators 118 which are summed by AND gates 120. The outputs of the AND gates 120 are filtered in low pass filters (LPFs) and then weighted by amplifiers 124. The result is a voltage histogram which shares many of the characteristics of the voltage histogram produced by the digital processor version of the controller 14 of FIG. 4.

The output of the voltage histogram generator 106 is input entered into a summing amplifier 126 of the quality factor generator 108. A LPF 128 develops a filtered quality factor Pfk.

The equalization control signal generator 110 is an equalization loop filter including a sample-and-hold circuit 130, a clock 132, a comparator 134 and an up/down counter 136. The equalization control signal generator, in this example, develops a digital equalization control signal Equ[N:0] for a DAC 86 to control the equalization of the CTLE 12'.

Gain control voltage detector 112 detects the peak voltage of the input signal on controller input 102. A comparator 138 determines whether TX>Vthmax, i.e. if the input signal exceeds the maximum voltage value. The output of comparator 138 in input into gain control signal generator 114 along with an output of a comparator 118a into LPF 140 and 142, respectively. The outputs of LPF 140 and 142 are applied to AND gates 144 and 146 which are coupled to the Dn and Up inputs of a counter 146. The counter 146 provides a digital gain control signal Kage[N:0] to DAC 88 to provide the Kage gain control signal to CTLE 12'.

The analog performance metrics for the example controller 14" of FIG. 7 are as follows:

TABLE 2

Analog Performance Metric

Voltage Histogram
$V_k(t) = ((Vth_k) < Tx(t) < (Vth_k + dV_k))$
Temporal Filtered Voltage Histogram
$Vf_k(t) = V_k(t) * h_{lpf1}(t)$
Performance Metric $$P(t) = \sum_k W_{rk} \cdot Vf_k(t)$$

Temporal Filtered Performance Metric
$Pf(t) = P(t) * h_{lpf2}(t)$

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A method for controlling a continuous time linear equalizer comprising:
    (a) developing a voltage histogram of a signal present at an output of a continuous time linear equalizer;
    (b) developing a quality factor for said voltage histogram;
    (c) comparing said quality factor with a prior quality factor;
    (d) decreasing an equalization of said continuous time linear equalizer if said quality factor is less than said prior quality factor and increasing said equalization of said continuous time linear equalizer if said quality factor is equal to or greater than said prior quality factor; and
    (e) repeating acts (a) to (d).

2. A method for controlling a continuous time linear equalizer as recited in claim 1 wherein acts (a) to (d) are repeated continuously.

3. A method for controlling a continuous time linear equalizer as recited in claim 2 wherein developing a voltage histogram further includes adjusting a gain of said continuous time linear equalizer.

4. A method for controlling a continuous time linear equalizer as recited in claim 3 wherein said gain is decreased if a parameter of said voltage histogram exceeds a maximum value and said gain is increased if a parameter of said voltage histogram is less than a minimum value.

5. A method for controlling a continuous time linear equalizer as recited in claim 2 wherein said quality factor is stored to be used as a prior quality factor.

6. A method for controlling a continuous time linear equalizer as recited in claim 5 wherein said voltage histogram is developed by a digital processor.

7. A method for controlling a continuous time linear equalizer as recited in claim 6 wherein said quality factor is developed by said digital processor.

8. A method for controlling a continuous time linear equalizer as recited in claim 7 wherein said comparing of said quality factor with said prior quality factor is accomplished by said digital processor.

9. A method for controlling a continuous time linear equalizer as recited in claim 5 wherein said voltage histogram is developed by a first plurality of electronic components.

10. A method for controlling a continuous time linear equalizer as recited in claim 6 wherein said quality factor is developed by a second plurality of electronic components.

11. A method for controlling a continuous time linear equalizer as recited in claim 7 wherein said comparing of said quality factor with said prior quality factor is accomplished by a third plurality of electronic components.

12. An apparatus for controlling a continuous time linear equalizer comprising:
    a signal input;
    an equalization control output;
    a voltage histogram signal generator responsive to a signal at said signal input and operative to develop a voltage histogram signal;
    a quality factor signal generator responsive to said voltage histogram signal and operative to develop a quality factor signal; and
    an equalization control signal generator responsive to said quality factor signal and operative to develop an equalization control signal at said equalization control output by comparing said quality factor with a prior quality factor and decreasing an equalization of said continuous time linear equalizer with said equalization control signal if said quality factor is less than said prior quality factor and increasing said equalization of said continuous time linear equalizer with said equalization control signal if said quality factor is equal to or greater than said prior quality factor.

13. An apparatus for controlling a continuous time linear equalizer as recited in claim 12 further comprising:
    a gain control output; and
    a gain control signal generator responsive to said voltage histogram signal an operative to develop a gain control signal at said gain control output.

14. An apparatus for controlling a continuous time linear equalizer as recited in claim 13 wherein said voltage histogram signal generator, said quality factor signal generator, said equalization control signal generator and said gain control signal generator are implemented, at least in part, on a digital processor capable of executing code segments stored in nonvolatile memory.

15. An apparatus for controlling a continuous time linear equalizer as recited in claim 14 further comprising a clock source coupled to said digital processor which is not phase locked to said signal at said signal input.

16. An apparatus for controlling a continuous time linear equalizer as recited in claim 13 wherein said voltage histogram signal generator, said quality factor signal generator, said equalization control signal generator and said gain control signal generator are implemented using electronic components not capable of executing code segments stored in nonvolatile memory.

17. A continuous time linear equalizer circuit comprising:
a continuous time linear equalizer having a signal input, a signal output and an equalization control input; and
a controller having a signal input coupled to said signal output of said continuous time linear equalizer and an equalization control output coupled to said equalization control input of said continuous time linear equalizer including:
a voltage histogram generator responsive to said signal input and operative to develop a voltage histogram signal;
a quality factor generator responsive to said voltage histogram and operative to develop a quality factor signal; and
an equalization control signal generator responsive to said quality factor signal and operative to develop an equalization control signal at said equalization control output by comparing said quality factor with a prior quality factor and decreasing an equalization of said continuous time linear equalizer with said equalization control signal if said quality factor is less than said prior quality factor and increasing said equalization of said continuous time linear equalizer with said equalization control signal if said quality factor is equal to or greater than said prior quality factor.

18. A continuous time linear equalizer circuit as recited in claim 17 wherein said continuous time linear equalizer further includes a gain control input and wherein said controller further includes a gain control output coupled to said gain control input of said continuous time linear equalizer and a gain control signal generator responsive to said voltage histogram signal and operative to develop a gain control signal at said gain control output.

19. An apparatus for controlling a continuous time linear equalizer comprising:
(a) means for developing a voltage histogram of an input signal;
(b) means for developing a quality factor for said voltage histogram; and
(c) means for developing an equalization control signal for a continuous time linear equalizer based, at least in part, upon said quality factor including:
(i) means for comparing said quality factor with a prior quality factor; and
(ii) means decreasing an equalization of said continuous time linear equalizer if said quality factor is less than said prior quality factor and increasing said equalization of said continuous time linear equalizer if said quality factor is equal to or greater than said prior quality factor.

20. An apparatus for controlling a continuous time linear equalizer as recited in claim 19 further comprising means for developing a gain control signal for said continuous time linear equalizer.

* * * * *